United States Patent
Ravi et al.

(10) Patent No.: US 11,001,743 B2
(45) Date of Patent: May 11, 2021

(54) TREATMENT FLUIDS COMPRISING SYNTHETIC SILICATES AND METHODS FOR USE

(71) Applicant: Halliburton Energy Services, Inc., Houston, TX (US)

(72) Inventors: Krishna M. Ravi, Kingwood, TX (US); Sandip Patil, Maharashtra (IN); Siva Rama Krishna Jandhyala, Maharashtra (IN); Sheetal Singh, Maharashtra (IN); Javier Urdaneta, Luanda (AO); William Pearl, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/470,457

(22) PCT Filed: Jan. 17, 2017

(86) PCT No.: PCT/US2017/013738
§ 371 (c)(1),
(2) Date: Jun. 17, 2019

(87) PCT Pub. No.: WO2018/136032
PCT Pub. Date: Jul. 26, 2018

(65) Prior Publication Data
US 2020/0010752 A1    Jan. 9, 2020

(51) Int. Cl.
*E21B 21/00* (2006.01)
*C09K 8/42* (2006.01)
(Continued)

(52) U.S. Cl.
CPC .............. *C09K 8/426* (2013.01); *C04B 28/24* (2013.01); *C09K 8/04* (2013.01); *C09K 8/48* (2013.01); *E21B 21/003* (2013.01); *E21B 33/138* (2013.01)

(58) Field of Classification Search
CPC .. C09K 8/426; C09K 8/04; C09K 8/48; C04B 28/24; E21B 21/003; E21B 33/138
See application file for complete search history.

(56) References Cited

U.S. PATENT DOCUMENTS

| 5,789,352 A | 8/1998 | Carpenter et al. |
| 6,279,655 B1 * | 8/2001 | Pafitis ................... C04B 14/106 166/294 |

(Continued)

OTHER PUBLICATIONS

Davies Stephen Nigel Thixotropic materials for oilwell applications, GB002296713A (Year: 1995).*

(Continued)

*Primary Examiner* — Silvana C Runyan
(74) *Attorney, Agent, or Firm* — Thomas Rooney; Baker Botts L.L.P.

(57) ABSTRACT

Methods for using treatment fluids comprising synthetic silicates in subterranean formations are provided. In some embodiments, the methods may comprise introducing a treatment fluid comprising an aqueous base fluid and a synthetic silicate into a wellbore penetrating at least a portion of a subterranean formation comprising a loss zone; allowing the treatment fluid to displace at least a portion of a first fluid present in the wellbore; and allowing the treatment fluid to at least partially plug the loss zone.

19 Claims, 3 Drawing Sheets

(51) Int. Cl.
*C04B 28/24* (2006.01)
*C09K 8/04* (2006.01)
*C09K 8/48* (2006.01)
*E21B 33/138* (2006.01)

(56) References Cited

U.S. PATENT DOCUMENTS

| | | |
|---|---|---|
| 7,927,419 B2 | 4/2011 | Roddy et al. |
| 8,689,869 B2 | 4/2014 | Shindgikar et al. |
| 2001/0022224 A1 | 9/2001 | Haberman |
| 2004/0020651 A1 | 2/2004 | Burts, III |
| 2011/0114318 A1 | 5/2011 | Ezell et al. |
| 2011/0162845 A1* | 7/2011 | Ravi ................. C09K 8/40 166/293 |
| 2012/0252705 A1* | 10/2012 | Sarap ................ C09K 8/40 507/108 |
| 2013/0180716 A1 | 7/2013 | Lende et al. |
| 2016/0230072 A1* | 8/2016 | Reddy ................ E21B 43/04 |

OTHER PUBLICATIONS

International Search Report and Written Opinion issued in related PCT Application No. PCT/US2017/013738 dated Sep. 19, 2017, 13 pages.

\* cited by examiner

TREATMENT FLUIDS COMPRISING SYNTHETIC SILICATES AND METHODS FOR USE

CROSS-REFERENCE TO RELATED APPLICATION

The present application is a U.S. National Stage Application of International Application No. PCT/US2017/013738 filed Jan. 17, 2017, which is incorporated herein by reference in its entirety for all purposes.

BACKGROUND

The present disclosure relates to methods and compositions for use in subterranean formations.

Treatment fluids are used in a variety of operations that may be performed in subterranean formations. As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids often are used in, e.g., well drilling, completion, and stimulation operations. Examples of such treatment fluids include, inter alia, drilling fluids, well cleanup fluids, workover fluids, conformance fluids, gravel pack fluids, acidizing fluids, fracturing fluids, spacer fluids, and the like.

Spacer fluids are often used in oil and gas wells to facilitate improved displacement efficiency when displacing multiple fluids in a well bore. For example, spacer fluids may be placed within a subterranean formation to physically separate incompatible fluids. Spacer fluids may also be placed between different drilling fluids during drilling-fluid changeouts, or between a drilling fluid and a completion brine.

Spacer fluids may be used in primary or remedial cementing operations to separate, inter alia, a drilling fluid from a cement composition that may be placed in an annulus between a casing string and the subterranean formation, or in the wellbore or inside a casing string, whether the cement composition is placed in the annulus in either the conventional or reverse-circulation direction. The cement composition often is intended, for example, to set in the annulus, supporting and positioning the casing string, and bonding to both the casing string and the formation to form a substantially impermeable barrier, or cement sheath, which facilitates zonal isolation. The cement composition also may set inside the casing or inside the wellbore. If the spacer fluid does not adequately displace the drilling fluid from the annulus, or the cement slurry does not adequately displace the spacer from the annulus, the cement composition may fail to bond to the casing string and/or the formation to the desired extent, or pockets of drilling fluid and/or spacer fluid may be left which could compromise the hydraulic isolation.

Many treatment techniques may be employed to address fluid loss that occurs during drilling, or other downhole operations such as plugging or bridging loss zones. However, plugged loss zones may be destabilized during casing/liner running or cementing. Current techniques for treating losses that occur after casing/liner has been lowered, such as the use of fluids containing lost circulation materials, may cause damage to tubulars or result in stuck pipe and pack-off problems.

BRIEF DESCRIPTION OF THE DRAWINGS

These drawings illustrate certain aspects of some of the embodiments of the present disclosure, and should not be used to limit or define the claims.

Figure 1:
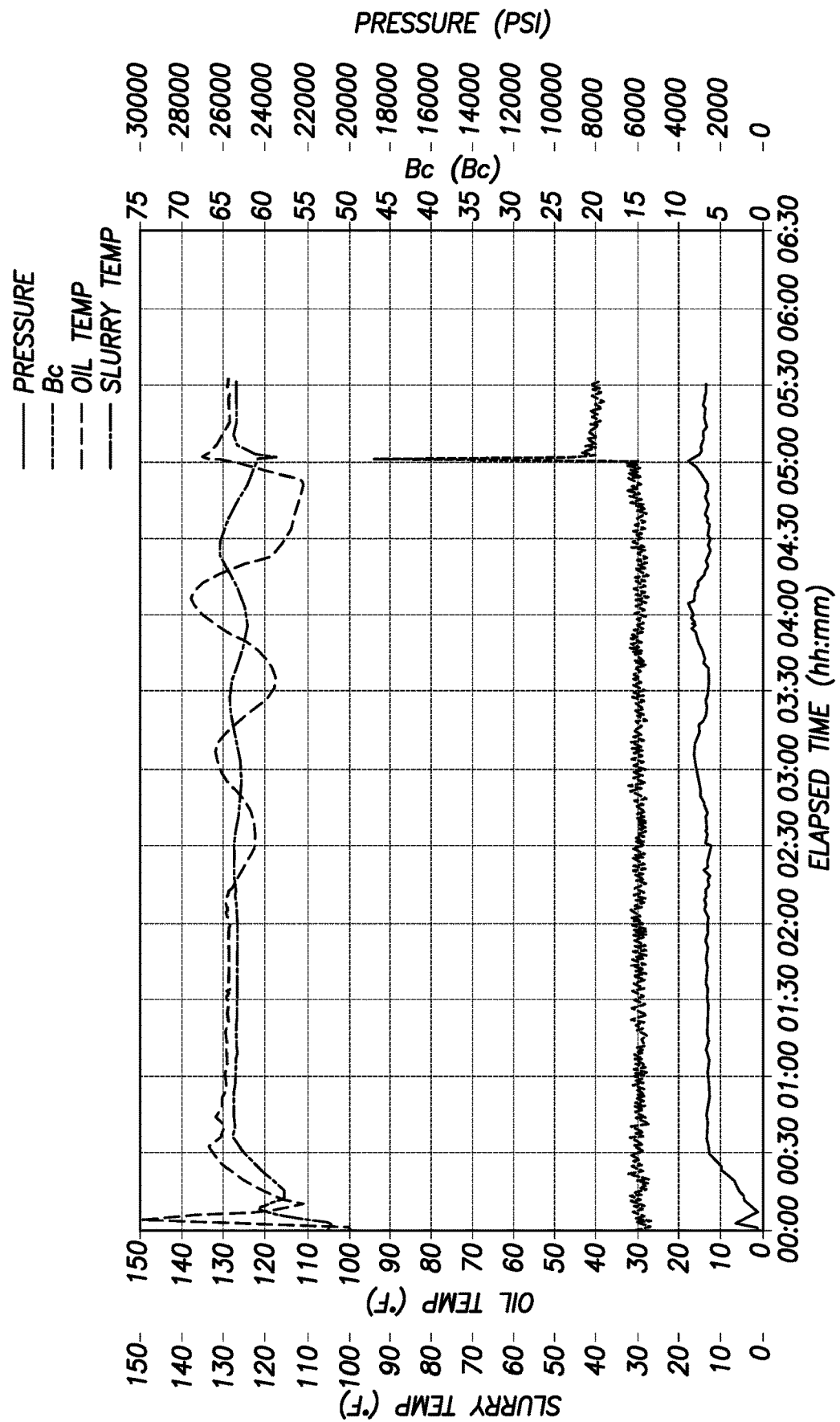
FIG. 1 is a graph illustrating data regarding consistency, pressure, oil temperature, and slurry temperature as a function of time for an on-off test performed in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

As used herein, "loss zone" refers to a portion of a subterranean formation into which fluids circulating in a wellbore may be lost. In certain embodiments, loss zones may comprise voids, vugular zones, wash-outs, lost circulation zones, perforations, natural fractures, induced fractures, and any combination thereof.

The present disclosure relates to methods and compositions for use in subterranean formations, and specifically, to treatment fluids comprising synthetic silicates and methods for use.

More specifically, the present disclosure provides methods comprising: introducing a treatment fluid comprising an aqueous base fluid and a synthetic silicate into a wellbore penetrating at least a portion of a subterranean formation comprising a loss zone; allowing the treatment fluid to displace at least a portion of a first fluid present in the wellbore; and allowing the treatment fluid to at least partially plug the loss zone. In certain embodiments, a treatment fluid may at least partially bridge the loss zone. In certain embodiments, a treatment fluid may at least partially plug the loss zone. In some embodiments, the treatment fluid may bridge or plug a substantial portion of the loss zone. In some embodiments, bridging the loss zone comprises allowing the fluid to build gel strength to thixotropic behavior. In some embodiments, the treatment fluid may reduce or prevent fluid flow into the loss zone.

In certain embodiments, the synthetic silicate is a synthetic magnesium silicate. In certain embodiments, the synthetic silicate is a layered synthetic silicate. In some embodiments, the synthetic silicate is selected from the group consisting of: sodium magnesium silicate, sodium magnesium silicate tetrasodium pyrophosphate, sodium magnesium fluorosilicate, sodium magnesium fluorosilicate tetrasodium pyrophosphate, and any combination thereof. In certain embodiments, the treatment fluid further comprises a weighting agent. In some embodiments, the treatment fluid is not settable. In some embodiments, the first fluid is a drilling fluid. In some embodiments, the treatment fluid substantially separates the first fluid from a second fluid. In some embodiments, the treatment fluid may contain surfactants and lost circulation materials. In some embodiments, the treatment fluid may contain rheology modifiers (e.g., viscosity and gel strength modifiers) and stabilizers.

In some embodiments, the present disclosure provides a method comprising: introducing a treatment fluid comprising an aqueous base fluid and a synthetic silicate into a wellbore penetrating at least a portion of a subterranean formation comprising a loss zone, wherein the treatment fluid displaces at least a portion of a first fluid present in the wellbore and reduces fluid flow into the loss zone. In some embodiments, the treatment fluid substantially reduces fluid flow into the loss zone. In certain embodiments, the present disclosure provides a method comprising: introducing a first fluid into a wellbore penetrating at least a portion of a subterranean formation comprising a loss zone; introducing a treatment fluid comprising an aqueous base fluid and a synthetic silicate into the wellbore; allowing the treatment fluid to displace at least a portion of the first fluid; and allowing the treatment fluid to at least partially bridge the loss zone.

Among the many potential advantages to the methods and compositions of the present disclosure, only some of which are alluded to herein, the methods and compositions of the present disclosure may provide improved treatment fluids for use in subterranean formations. For example, in certain embodiments, the treatment fluids of the present disclosure may prevent fluid loss due to rapid gel strength buildup. Moreover, the treatment fluids of the present disclosure may be versatile and suitable for use in a variety of treatment applications and conditions, including, but not limited to conventional cementing, a reverse cementing process, and a top fill cementing process. Additionally, the methods and compositions of the present disclosure may be suitable for a wide range of temperatures, loss rates, water salinities, and fluid densities.

In some embodiments, the treatment fluids and methods of the present disclosure may provide a robust yet breakable gel that may, for example, avoid pack-off problems in traditional liner applications. In addition, the methods and compositions of the present disclosure may provide a treatment fluid with sufficiently high yield point and cake cleaning ability to perform traditional spacer fluid functions in addition to reducing loss. Moreover, in certain embodiments, the methods and compositions of the present disclosure may provide improved fluid and mud displacement over traditional spacer fluids, even in eccentric sections of the annulus. Without being bound by theory, it is believed that in certain embodiments, improved displacement is due to the thixotropic properties of the treatment fluid provided by the synthetic silicate.

The treatment fluids of the present disclosure may comprise a synthetic silicate. Synthetic silicates may be made up of simple or complex salts of silicic acids. In certain embodiments, the synthetic silicate may be synthetic magnesium silicate. In some embodiments, the synthetic silicate is selected from the group consisting of: sodium magnesium silicate, sodium magnesium silicate tetrasodium pyrophosphate, sodium magnesium fluorosilicate, sodium magnesium fluorosilicate tetrasodium pyrophosphate, and any combinations and derivatives thereof. In certain embodiments, a synthetic silicate may be a synthetic smectite. Synthetic smectites may be aqueous mixtures of water and synthetic trioctahedral smectites which are similar to the natural clay hectorite. In embodiments, some synthetic smectites are layered hydrous sodium lithium magnesium silicates, further, some may be modified with tetrasodiumpyrophosphate. In certain embodiments, the synthetic silicate is a layered synthetic silicate such as LAPONITE RD® available from BYK Additives, Inc. in Gonzales, Tex. or THERMA-VIS™, available from Halliburton Energy Services, Inc. in Houston, Tex. In some embodiments, the synthetic silicate is present in an amount of about 0.1% to about 3% by weight of (bwo) water. The synthetic silicate may be included in the treatment fluids in an amount sufficient to provide, for example, the desired rheological properties.

In some embodiments, the synthetic silicate may be present in the treatment fluids in an amount of from about 1% to about 65% by weight of the treatment fluid (e.g., about 1%, about 5%, about 10%, about 15%, about 20%, about 25%, about 30%, about 35%, about 40%, about 45%, about 50%, about 55%, about 60%, about 65%, etc.). In some embodiments, the synthetic silicate may be present in the treatment fluids in an amount of from about 5% to about 60% by weight of the treatment fluid. In some embodiments, the synthetic silicate may be present in an amount of from about 20% to about 35% by weight of the treatment fluid. Alternatively, the amount of synthetic silicate may be expressed by weight of dry solids. As used herein, the term "by weight dry solids" refers to the amount of a component, such as synthetic silicate, relative to the overall amount of dry solids used in preparation of the treatment fluid. For example, the synthetic silicate may be present in an amount of from about 1% to 100% by weight of dry solids (e.g., about 1%, about 5%, about 10%, about 20%, about 30%, about 40%, about 50%, about 60%, about 70%, about 80%, about 90%, 100%, etc.). In some embodiments, the synthetic silicate may be present in an amount of from about 50% to 100% and, alternatively, from about 80% to 100% by weight of dry solids. In certain embodiments, the synthetic silicate may be added as particles having a diameter of less than about 100 nanometer (nm) diameters, alternately, less than about 50 nm, alternately, less than about 40 nm.

In certain embodiments, the treatment fluid may comprise a natural clay. In some embodiments, examples of natural clays may comprise, but are not limited to natural hectorite, smectite, or silicate. In certain embodiments, the treatment fluid may be substantially free of a natural clay. Further, in an embodiment, substantially no natural clay (e.g., less than 1%) is added to or included in the treatment fluid composition.

In certain embodiments, the treatment fluid may be thixotropic. A thixotropic material is a material for which viscosity decreases over time when using a constant or increasing shear rate. As shear rate decreases, the material will gradually recover the original internal structure before shear. Shear rate may be increased, for example, by pumping the treatment fluid. Without being limited by theory, it is believed that in some embodiments the synthetic silicate may impart a thixotropic or a substantially thixotropic behavior to the treatment fluid. In some embodiments, thixotropy may be measured by dial readings on a Fann viscometer at different rpm. In some embodiments, the dial readings on a Fann Yield Strength Adapter (FYSA) at 3 rpm may be substantially similar to the dial readings at 300 rpm for the treatment fluid at 127° F. In some embodiments, a synthetic silicate may be present in a sufficient amount to make the treatment fluid thixotropic.

In an embodiment, the treatment fluid may be a gellable fluid. In certain embodiments, a gellable fluid may form a highly rubbery and elastic gel upon placement in or after entering a loss zone and may be characterized by an adjustable gel time ranging from nearly instantaneous to a few hours. In an embodiment, a gellable treatment fluid comprises a fluid with little to no yield stress prior to gelling. In an embodiment, the gellable treatment fluid may have a gel time shorter than the time required to place the treatment fluid in the loss zone. In some embodiments, the treatment fluid may be gellable but not settable.

In some embodiments, the treatment fluids of the present disclosure may comprise a weighting agent. Examples of suitable solid weighting agents include, but are not limited to barite, hematite, calcium carbonate, magnesium carbonate, iron carbonate, zinc carbonate, manganese tetraoxide, ilmenite, NaCl, KCl, CaCl$_2$, formate salts, and any combination thereof. These weighting agents may be at least partially soluble or insoluble in the treatment fluid. In some embodiments, a weighting agent may be present in the treatment fluids in an amount of from about 1% to about 60% by weight of the treatment fluid (e.g., about 5%, about 10%, about 15%, about 20%, about 25%, about 30%, about 35%, about 40%, about 45%, about 50%, about 55%, etc.). In some embodiments, the weighting agents may be present in the treatment fluids in an amount of from about 1% to about 35% by weight of the treatment fluid. In some embodiments, the weighting agent may be present in the treatment fluids in an amount of from about 1% to about 10% by weight of the treatment fluid. Alternatively, the amount of weighting agent may be expressed by weight of dry solids. For example, the weighting agent may be present in an amount of from about 1% to about 99% by weight of dry solids (e.g., about 1%, about 5%, about 10%, about 20%, about 30%, about 40%, about 50%, about 60%, about 70%, about 80%, about 90%, about 99%, etc.). In some embodiments, the weighting agent may be present in an amount of from about 1% to about 20% and, alternatively, from about 1% to about 10% by weight of dry solids.

Certain components of the treatment fluid may be provided as a "dry mix" to be combined with the base fluid and/or other components prior to or during introducing the treatment fluid into the subterranean formation. In some embodiments, dry mix compositions may be designed to include a base fluid in an amount from about 1 to about 20 gallons per 94-lb sack of dry blend (gal/sk). In certain embodiments, dry mix compositions may be suitable for base fluids in the amount of 10 gal/sk. In some embodiments, dry mix compositions may be suitable for base fluids in the amount of 13.5 gal/sk. Embodiments of the treatment fluids of the present invention may be prepared in accordance with any suitable technique. In some embodiments, the desired quantity of water may be introduced into a mixer (e.g., a cement blender) followed by the dry blend. The dry blend may comprise the synthetic silicate and additional solid additives, for example. Additional liquid additives, if any, may be added to the water as desired prior to, or after, combination with the dry blend. This mixture may be agitated for a sufficient period of time to form a slurry. It will be appreciated by those of ordinary skill in the art, with the benefit of this disclosure, other suitable techniques for preparing treatment fluids may be used in accordance with embodiments of the present invention.

In some embodiments, the treatment fluids of the present disclosure may comprise a fluid loss control additive. Examples of suitable fluid loss control additives include FILTER-CHEK™ fluid (i.e., carboxymethyl starch), N-DRIL™ HT PLUS fluid (i.e., a crosslinked corn starch), PAC™ fluid (i.e., polyanionic cellulose), all of which are commercially available from Halliburton Energy Services, Inc., and combinations thereof. In some embodiments, the amount of fluid loss control additive present in the treatment fluid is in a range of from about 2 lb/bbl to about 6 lb/bbl. In some embodiments, the fluid loss control additive may be present in an amount from about 0.01% bwo a weighting agent in the treatment fluid to about 5% bwo a weighting agent.

In some embodiments, the treatment fluids may further comprise a lightweight additive. The lightweight additive may be included to reduce the density of embodiments of the treatment fluids. For example, the lightweight additive may be used to form a lightweight treatment fluid having a density of less than about 13 lb/gal. The lightweight additive typically may have a specific gravity of less than about 2.0. Examples of suitable lightweight additives may include, but are not limited to sodium silicate, hollow microspheres, gilsonite, perlite, and any combinations thereof. An example of a sodium silicate suitable for certain embodiments of the present disclosure is ECONOLITE™ additive, available from Halliburton Energy Services, Inc. In certain embodiments, the lightweight additive may be present in an amount of from about 0.1% to about 20% by weight of dry solids. In certain embodiments, the lightweight additive may be present in an amount of from about 1% to about 10% by weight of dry solids. In certain embodiments, the lightweight additive may be present in an amount from about 0.01% bwo a weighting agent in the treatment fluid to about 5% bwo a weighting agent.

In certain embodiments, the treatment fluids may comprise lime. In certain embodiments, the lime may be hydrated lime. In some embodiments, the lime may be present in an amount of from about 0.01% to about 5% bwo a weighting agent in the fluid. In certain embodiments, the lime may be present in an amount of at least 0.7% bwo the weighting agent in the treatment fluid.

In certain embodiments, the treatment fluids of the present disclosure may comprise lost circulation materials or bridging agents. In some embodiments, lost circulation materials may be included in the compositions as a secondary mechanism to cure the losses without altering the thixotropic behavior of the treatment fluid. In certain embodiments, lost circulation materials may include, but are not limited to, BARACARB® particulates (ground marble, available from Halliburton Energy Services, Inc.) including BARACARB® 5, BARACARB® 25, BARACARB® 150, BARACARB® 600, BARACARB® 1200; STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.); and the like; and any combination thereof. In certain embodiments, the treatment fluid does not include a lost circulation material. In certain embodiments, the treatment fluid does not comprise a bridging agent. In some embodiments, the treatment fluid is free or substantially free of particulates.

In certain embodiments, the treatment fluids of the present disclosure may be suitable for use at a variety of temperatures, pH levels, water salinities, and mineralogies of subterranean formations. In some embodiments, the materials that make up the treatment fluids compositions function at temperatures above 400° F. and thus the behavior of the compositions is likely to be unaffected at temperatures above 400° F. Thus, in certain embodiments, the treatment fluids may provide effective fluid displacement, loss zone treatment, or both, even when used in conditions at or above 400° F. Moreover, the properties of treatment fluids may be effective over a range of pH levels. For example, in certain embodiments, the treatment fluids may provide effective fluid displacement and loss zone treatment from a pH of about 7 to about 12. Additionally, the treatment fluids of the present disclosure may be suitable for a variety of subterranean formations, including, but not limited to shale formations and carbonate formations.

In certain embodiments, the treatment fluids may further comprise a free water control additive. As used herein, the term "free water control additive" refers to an additive included in a liquid for, among other things, reducing (or preventing) the presence of free water in the liquid. Free water control additives may also reduce (or prevent) the settling of solids. Examples of free water control additives suitable for certain embodiments of the present disclosure include, but are not limited to, bentonite, amorphous silica, hydroxyethyl cellulose, and combinations thereof. An example of a suitable free water control additive is SA-1015EXP™ suspending agent, available from Halliburton Energy Services, Inc. Another example of a suitable free water control additive is WG17™ solid additive, available from Halliburton Energy Services, Inc. The free water control additive may be provided as a dry solid in some embodiments. In certain embodiments, the free water control additive may be present in an amount of from about 0.1% to about 16% bwo a weighting agent in the treatment fluid. In some embodiments, the free water control additive may be present in an amount of from about 0.1% to about 2% bwo the weighting agent. In certain embodiments, the free water control additive may be present in the treatment fluid in an amount from about 0.2 lb/bbl to about 10 lb/bbl.

In some embodiments, the treatment fluids may have a density of from about 0.5 grams per cubic centimeter (g/cc) to about 4.0 g/cc, alternatively from about 0.8 g/cc to about 3 g/cc, alternatively from about 1.0 g/cc to about 2.5 g/cc. The density may be measured by any suitable methodology. For example, the density may be measured using a pressurized fluid density balance in accordance with the American Petroleum Institute (API) recommend practices.

As used herein, "yield point' is the value obtained from the Bingham-Plastic rheological model when extrapolated to a shear rate of zero. As used herein, the "gel strength" of a treatment fluid is a measure of the suspending characteristics, or the thixotropic properties of a fluid, measured in pounds per 100 square feet (lb/100 ft$^2$). Gel strength may be measured according to API 13B-2 section 6.3, Recommended Practice for Field Testing of Oil-based Drilling Fluids. In some embodiments, the treatment fluid has a 10 second gel strength of at least 20 lbf/100 ft$^2$. In some embodiments, the treatment fluid has a 30 minute gel strength of about 40 lbf/100 ft$^2$ or greater. In some embodiments, the treatment fluid has a 60 minute gel strength of about 70 lbf/100 ft$^2$ or greater. In certain embodiments, a synthetic silicate is in a sufficient concentration such that the treatment fluid has a 10 second gel strength of about 20 lbf/100 ft$^2$ or greater, a 30 minute gel strength of about 40 lbf/100 ft$^2$ or greater, a 60 minute gel strength of about 70 lbf/100 ft$^2$ or greater, or a combination thereof. In some embodiments, if the gel strength values are too high or too low, the volume of the treatment fluid may be adjusted to bring the gel strength values into the desired range.

In some embodiments, the treatment fluids of the present disclosure may displace at least a portion of a first fluid present in the wellbore. The first fluid may be any type of treatment fluid, including, but not limited to a drilling fluid, spacer fluid, completion fluid, cementing fluid, and the like. In certain embodiments, the treatment fluids of the present disclosure may displace substantially all of the first fluid present in a wellbore. In some embodiments, the first fluid may be a drilling fluid. In some embodiments, a second fluid may be introduced into the wellbore to displace at least a portion of the treatment fluid present in the wellbore. In certain embodiments, the treatment fluid may separate a first fluid from a second fluid. For example, in some embodiments, the treatment fluid may separate a drilling fluid from a cementing fluid.

In primary well cementing operations, a cement slurry is pumped into the annulus between a string of casing or other pipe disposed in the wellbore and the walls of the wellbore for the intended purpose of sealing the annulus, supporting the casing or pipe and protecting the casing or pipe from corrosive elements in the wellbore. Incomplete displacement of the drilling fluid often prevents the formation of an adequate bond between the cement, the casing or pipe and the wellbore.

The removal of gelled drilling fluid and filter cake is further complicated if the casing or other pipe to be cemented in a well bore is not centered in the well bore. The resulting eccentric annulus promotes fluid flow through the wide side of the annulus as a result of resistance to flow being less therein. Since a cement slurry often does not flow as readily through the narrow side of the annulus, all of the drilling fluid in the annulus may not be displaced by the slurry. Deviated wellbores often have eccentric annuli due to the difficulty in properly centralizing the casing or pipe prior to cementing.

In certain embodiments, the treatment fluids of the present disclosure may be effective at displacing a fluid in an eccentric annulus due to shear thinning properties of the spacer composition. For example, in some embodiments, there is equal resistance to flow in both narrow side and wider side of the casing-formation annulus because the variation in shear stress with shear rate is negligible. This would mean that in case of eccentric annulus, the treatment fluid will effectively displace the drilling fluid on both the wider side of the annulus but also on the narrow side of the annulus.

In certain embodiments, when a portion of the treatment fluid enters into a loss zone in the subterranean formation, the shear rate on it may decrease drastically. This triggers a steep increase in the gel strength which in turn results in the spacer stopping near the wellbore. Thus, effective near wellbore screen out is achieved as early as possible increasing the resistance to flow into the loss zone. Due to the increase in flow resistance, the succeeding cement train may prefer to flow through the annulus instead of flowing into the loss zone. The amount of time required to stop flow and the volume swept may depend on the type of loss zone, the differential pressure applied across the loss zone, the volume of the treatment fluid, and the gel strength build up rate of the treatment fluid. In some embodiments, the gel strength increase is quantified based on the 10 minute gel strength.

In some embodiments, the methods of the present disclose may comprise introducing at least a portion of the treatment fluid within a loss zone or other flowpath through which the flow of fluids may be desirably reduced or ceased and causing or allowing the treatment fluid to gel. In some embodiments, the treatment fluid may be introduced to the wellbore to prevent the loss of aqueous or non-aqueous fluids into loss zones such as voids, vugular zones, perforations, and natural or induced fractures.

In some embodiments, the thixotropic properties of the treatment fluids of the present disclosure allow the treatment fluids to provide effective fluid displacement even in low equivalent circulating density (ECD) applications. As used herein, "ECD" is the combined downhole pressure due to hydrostatic head and frictional loss during circulation, listed as density at the depth of interest. Low ECD may occur when the difference between pore pressure and fracture pressure at a given depth is small. In low ECD applications, there may be less tolerance to changes in hydrostatic or friction pressure while remaining within safe operating ranges of pore pressure and fracture pressure.

In certain embodiments, low fluid loss is a desirable property of a treatment fluid. Fluid loss test results may be used to indicate how much fluid might leak off into a formation. As used herein, the "fluid loss" of a treatment fluid is tested according to API procedure at a specified temperature and pressure differential as follows. The heating jacket of the testing apparatus is preheated to approximately 6° C. (10° F.) above the specified temperature. The treatment fluid is stirred for 5 min using a field mixer. The treatment fluid is poured into the filter cell. The testing apparatus is assembled with a filter paper inserted into the apparatus. The treatment fluid is heated to the specified temperature. When the treatment fluid reaches the specified temperature, the lower valve stem is opened and the specified pressure differential is set (measured in units of pounds force per square inch "psi" or megapascals "MPa"). A timer is started and filtrate out of the testing apparatus is collected in a separate volumetric container. The testing is performed for 30 min. The total volume of filtrate collected is read. Fluid loss is measured in milliliters (mL) of fluid collected in 30 min. The total mL of fluid loss is then multiplied by 2 to obtain the API fluid loss for the treatment fluid in units of mL/30 min. In some embodiments, the treatment fluid has an API fluid loss of less than about 68 mL/30 min at 127° F., or less than about 48 mL/30 min at 127° F. In some embodiments, the treatment fluid has an API fluid loss of less than about 82 mL/30 min at 190° F. In some embodiments, the synthetic silicate is in a sufficient concentration such that the treatment fluid has an API fluid loss of less than about 68 mL/30 min at 127° F., or less than about 48 mL/30 min at 127° F. In certain embodiments, synthetic silicate is in a sufficient concentration such that the treatment fluid has an API fluid loss of less than about 82 mL/30 min at 190° F.

The compositions used in the methods of the present disclosure may comprise any aqueous base fluid known in the art. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods and compositions of the present disclosure may comprise water from any source. Such aqueous fluids may comprise fresh water, salt water (e.g., water containing one or more salts dissolved therein), brine (e.g., saturated salt water), seawater, or any combination thereof. The aqueous fluids may comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In an embodiment, the amount of base fluid present in the treatment fluid may be from about 50 to about 95 percent by weight (wt. %) of the treatment fluid, alternatively, from about 70 wt. % to about 90 wt. %, alternatively, from about 70 wt. % to about 85 wt. %.

In certain embodiments, the methods and compositions of the present disclosure optionally may comprise any number of additional additives. Examples of such additional additives include, but are not limited to, salts, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, $H_2S$ scavengers, $CO_2$ scavengers, oxygen scavengers, lubricants, viscosifiers, breakers, relative permeability modifiers, resins, wetting agents, coating enhancement agents, filter cake removal agents, antifreeze agents (e.g., ethylene glycol), crosslinking agents, curing agents, gel time moderating agents, curing activators, and the like. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

The methods and compositions of the present disclosure can be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments. In certain embodiments, a treatment fluid may be introduced into a subterranean formation. In some embodiments, the treatment fluid may be introduced into a wellbore that penetrates a subterranean formation. In some embodiments, the treatment fluid may be introduced at a pressure sufficient to create or enhance one or more fractures within the subterranean formation (e.g., hydraulic fracturing).

The methods and compositions of the present disclosure may directly or indirectly affect one or more components or pieces of equipment associated with the preparation, delivery, recapture, recycling, reuse, and/or disposal of the compositions of the present disclosure. For example, the methods and compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the compositions of the present disclosure. The methods and compositions of the present disclosure may also directly or indirectly affect any transport or delivery equipment used to convey the fluid to a well site or downhole such as, for example, any transport vessels, conduits, pipelines, trucks, tubulars, and/or pipes used to compositionally move fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, and/or combinations thereof, and the like. The methods and compositions of the present disclosure may also directly or indirectly affect the various downhole equipment and tools that may come into contact with the fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. In some embodiments, the treatment fluid is introduced into a wellbore using one or more pumps. In some embodiments, at least one of the first fluid and the second fluid are introduced into the wellbore using one or more pumps.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

The following examples use a series of compositions as described in Tables 1 and 2. Table 1 shows the components of compositions suitable, for example, for 13.5 gal/sk spacer fluids. Table 2 shows the components of compositions suitable, for example, for 10 gal/sk spacer fluids. In Tables 1 and 2, MF-1 through -6 are compositions according to certain embodiments of the present disclosure and Conventional spacer-1 and Conventional spacer-2 are conventional spacer fluid compositions.

TABLE 1

| Material | Units of Measurement | MF-1 | MF-2 | MF-3 | MF-4 | MF-5 | Conventional spacer-1 |
|---|---|---|---|---|---|---|---|
| Barite | % by weight of (bwo) barite | 100 | 100 | 100 | 100 | 100 | 100 |
| FDP-C984-10 | % bwo water | 2.35 | 2.6 | 3.0 | 1.5 | 2.0 | — |
| Water | % bwo barite | 100.8 | 101 | 101.2 | 98.5 | 100.4 | 110 |
| Lime | % bwo barite | — | — | — | 0.7 | — | — |
| Econolite Liquid | % bwo barite | — | — | — | 1.0 | — | — |
| SA-1015EXP | % bwo barite | — | — | — | 1.0 | — | — |
| Conventional spacer blend | % bwo barite | — | — | — | — | — | 19.7 |
| PAC-L | % bwo barite | — | — | — | — | 0.25 | — |

TABLE 2

| Material | Units of Measurement | MF-6 | Conventional spacer-2 |
|---|---|---|---|
| Barite | % bwo barite | 100 | 100 |
| FDP-C984-10 | % bwo water | 3.0 | — |
| Water | % bwo barite | 383 | 759 |
| Conventional spacer blend | % bwo barite | — | 156 |

As listed in Tables 1 and 2, FDP-C984-10 is a synthetic silicate, specifically, LAPONITE®. The FDP-C984-10 material was LAPONITE® RD available from BYK Additives, Gonzales, Tex. The Econolite liquid is ECONOLITE™, a sodium silicate additive available from Halliburton Energy Services, Inc., in Houston, Tex. SA-1015EXP™ is the liquid form of a suspending agent available from Halliburton Energy Services, Inc., in Houston, Tex. The conventional spacer blend is a mixture of natural clay and suspending agents. The PAC™-L material is a natural polyanionic cellulosic polymer filtration control agent available from Halliburton Energy Services, Inc., Houston, Tex.

Example 1

In this example, thixotropic behavior is quantified for the compositions described in Tables 1 and 2 based on American Petroleum Institute ("API") rheology measured as rpm versus dial reading using a FANN viscometer, and based on the API 10 minute gel strength measured in lbf/100 ft$^2$. Dial readings were taken for each composition using a Fann Yield Strength Adapter (FYSA) at 127° F. at speeds of 300, 200, 100, 6, and 3 rotations per minute ("rpm"). Gel strength measurements were taken at 10 seconds, 10 minutes, 30 minutes, and 60 minutes for each composition. Composition MF-2 and conventional spacer-1 were also tested at 190° F. Additionally, API fluid loss was measured for certain compositions according to API specifications at ambient (room) temperature and 100 psi differential pressure using a static filter press. The results of these tests are shown in Tables 3 and 4. In those tables, the dial readings on FYSA signify shear rate and the rpm of the FYSA signify shear stress.

TABLE 3

| Spacer | Temperature (° F.) | Dial Reading on FYSA | | | | | FYSA Gel Strength (lbf/100 ft²) | | | | API Fluid Loss mL/30 mm |
|---|---|---|---|---|---|---|---|---|---|---|---|
| | | 300 | 200 | 100 | 6 | 3 | 10 sec | 10 min | 30 min | 60 min | |
| MF-1 | 127 | 25 | 25 | 25 | 25 | 24 | 27 | 55 | — | — | — |
| MF-2 | 127 | 35 | 35 | 35 | 35 | 35 | 38 | 80 | 85 | 100 | 68 |
|  | 190 | 35 | 35 | 35 | 35 | 34 | 37 | 78 | — | — | 82 |
| MF-3 | 127 | 56 | 55 | 55 | 55 | 54 | 55 | 125 | 136 | — | — |
| MF-4 | 127 | 74 | 65 | 50 | 29 | 25 | 27 | 70 | 89 | — | — |
| MF-5 | 127 | 60 | 55 | 55 | 43 | 42 | 56 | 90 | | | 48 |
| Conventional spacer-1 | 127 | 32 | 28 | 24 | 15 | 13 | 12 | 20 | — | — | — |
|  | 190 | 29 | 25 | 22 | 14 | 12 | 12 | 22 | — | — | — |

TABLE 4

| Spacer | Temperature (° F.) | Dial Reading on FYSA | | | | | FYSA Gel Strength (lbf/100 ft²) | |
|---|---|---|---|---|---|---|---|---|
| | | 300 | 200 | 100 | 6 | 3 | 10 sec | 10 min |
| MF-6 | 127 | 40 | 40 | 40 | 39 | 39 | 41 | 75 |
| Conventional spacer-2 | 127 | 26 | 23 | 20 | 11 | 9 | 9 | 11 |

As shown in Tables 3 and 4, the dial readings for the treatment fluids prepared in accordance with certain embodiments of the present disclosure did not significantly increase with an increase in rpm. For example, the dial readings essentially remained constant with an increase in rpm for MF-1, MF-2, and MF-3. This indicates that the viscosity of the treatment fluids of the present disclosure decreases significantly with an increase in shear rate, demonstrating very high shear thinning nature. In certain embodiments, this high shear thinning nature may be indicative of a marginal increase in pumping pressures for significant increases in flow rate. As shown in Table 3, the API fluid loss for MF-5 is 48 mL, indicating low fluid loss.

As seen by the MF-2 test results in Table 3, the rheology of the compositions of the present disclosure is not significantly affected by temperature. In addition, the materials that make up these compositions work at temperatures above 400° F. and thus the behavior of the compositions is likely to be unaffected at temperatures above 400° F.

Example 2

In this example, composition MF-2 was subjected to an on-off test in a FANN Model 290 High-Pressure High-Temperature (HPHT) Consistometer to test for the risk of stuck drill pipe or casing. The on-off test involves mixing the composition at 150 rpm for a period of time (known as the "dynamic condition") and then going static for a short period of time, after which the mixing is started again. Consistency of the composition was measured in Bearden units of consistency (Bc), a dimensionless quantity. The composition was ramped to a temperature of 127° F. and a pressure of 3,000 psi and was in a dynamic condition for total of 2 hours. FIG. 1 is a graph of pressure, consistency (Bc), oil temperature, and slurry temperature over time for the on-off test of the MF-2 composition. As shown in FIG. 1, the Bc value during the dynamic condition was around 15. Then motor was then stopped for 3 hours and it was restarted. After restart, the Bc value spiked to around 45 and then came back to lower value of 20. These values indicate that it would be easy to circulate the MF-2 composition around a liner top and remove the drill pipe after primary cementing.

Example 3

Figure 2:
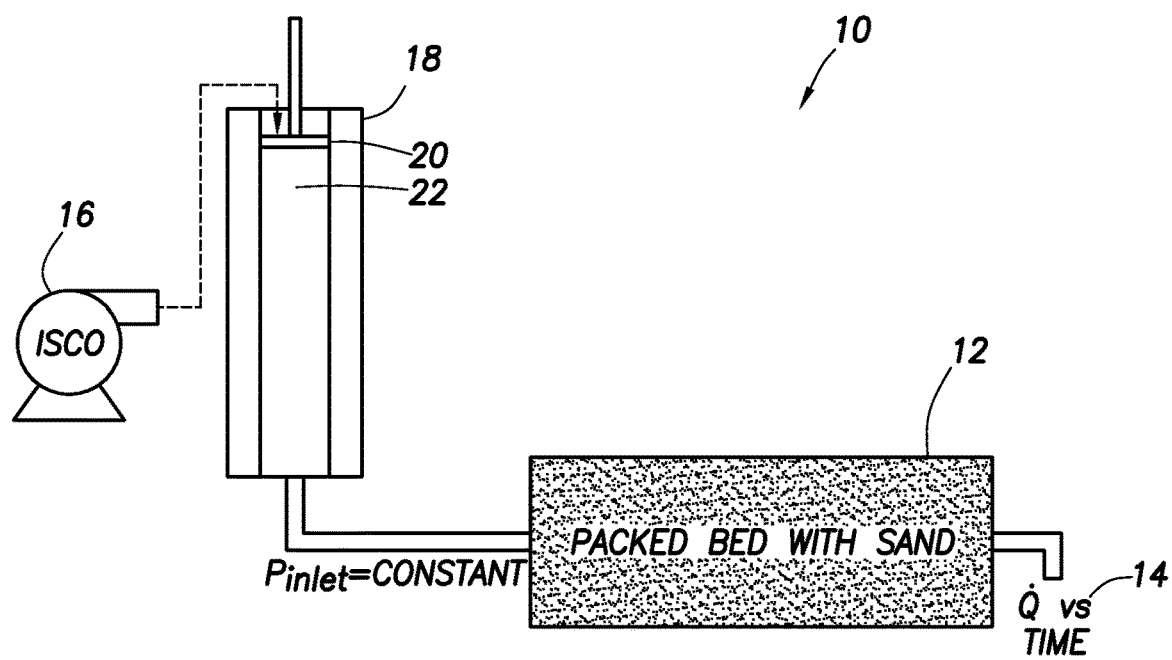
FIG. 2 is a schematic representation of an experimental setup for simulating a treatment fluid plugging a loss zone in accordance with certain embodiments of the present disclosure.

In this example, a custom experimental setup was used to simulate a composition of the present disclosure plugging a loss zone. FIG. 2 is a schematic representation of the experimental setup 10 for this example. The experiment consisted of pushing the slurry 22 at a constant inlet pressure through a random packed bed 12 and measuring the outflow rate (Q) as a function of time 14. The experimental procedure generally corresponds to equivalent field procedures. For example, the packed bed 12 replicates a loss zone in the field and pumping the spacer into the packed bed 12 simulates pumping a spacer fluid into a wellbore comprising a loss zone.

Figure 3A:
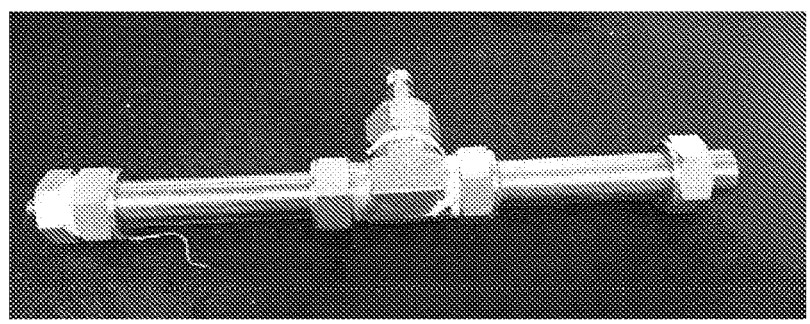
FIGS. 3A-3C are photographs showing an experimental setup for simulating a treatment fluid plugging a loss zone in accordance with certain embodiments of the present disclosure.
Figure 3B:
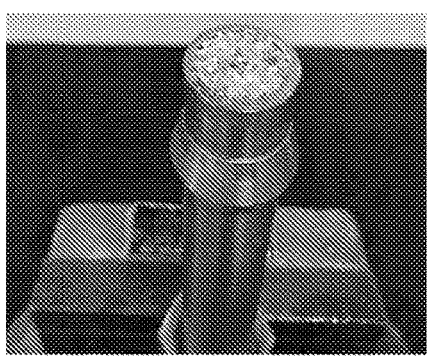
Figure 3C:

This packed bed 12 is packed with 20 to 40 mesh sand. The cross section of the packed bed is circular with a 1 inch diameter. The length of the packed bed 12 is 34 cm. The inlet pressure was maintained at 50 psi using an Isco pump 16 and piston 20. The outlet 14 was maintained at atmospheric pressure. The test was conducted at a constant temperature of 127° F. using a heater jacket 18. FIGS. 3A-C are photographs of the test setup, a cross-sectional view of the untreated packed bed and a cross-sectional view of the treated bed, respectively.

The first step of the procedure was to pump water through the packed bed 12 at three different constant pressure drops and measure flow rate for each. These relationships gave a permeability of the packed bed as approximately 25-30 Darcy. This is similar to an injectivity test that would be performed in the field to assess the flow behavior in a loss zone.

Second, the MF-2 fluid composition was pumped through the packed bed at constant pressure and the volume of fluid swept before the fluid came to rest and the time for fluid to come to rest were measured. This is comparable to the volume swept through a loss zone in a wellbore before the spacer fluid stops further flow or a measure of the extent of near wellbore screen out.

The results of this experimental procedure are shown in Table 5, which shows the experimental sequence and the outcome of each step.

TABLE 5

| Step Number | Step description | Outcome |
|---|---|---|
| 1 | Injectivity test with water at three different pressure differentials | Permeability of packed bed varied from 25 to 30 Darcy. |
| 2 | Pumping MF-2 spacer at a constant differential pressure of 50 psi until flow comes to rest. | Fluid flowed continuously at 5 mL/min for a few seconds and the flow stopped after about 16 minutes. |

Figure 4:
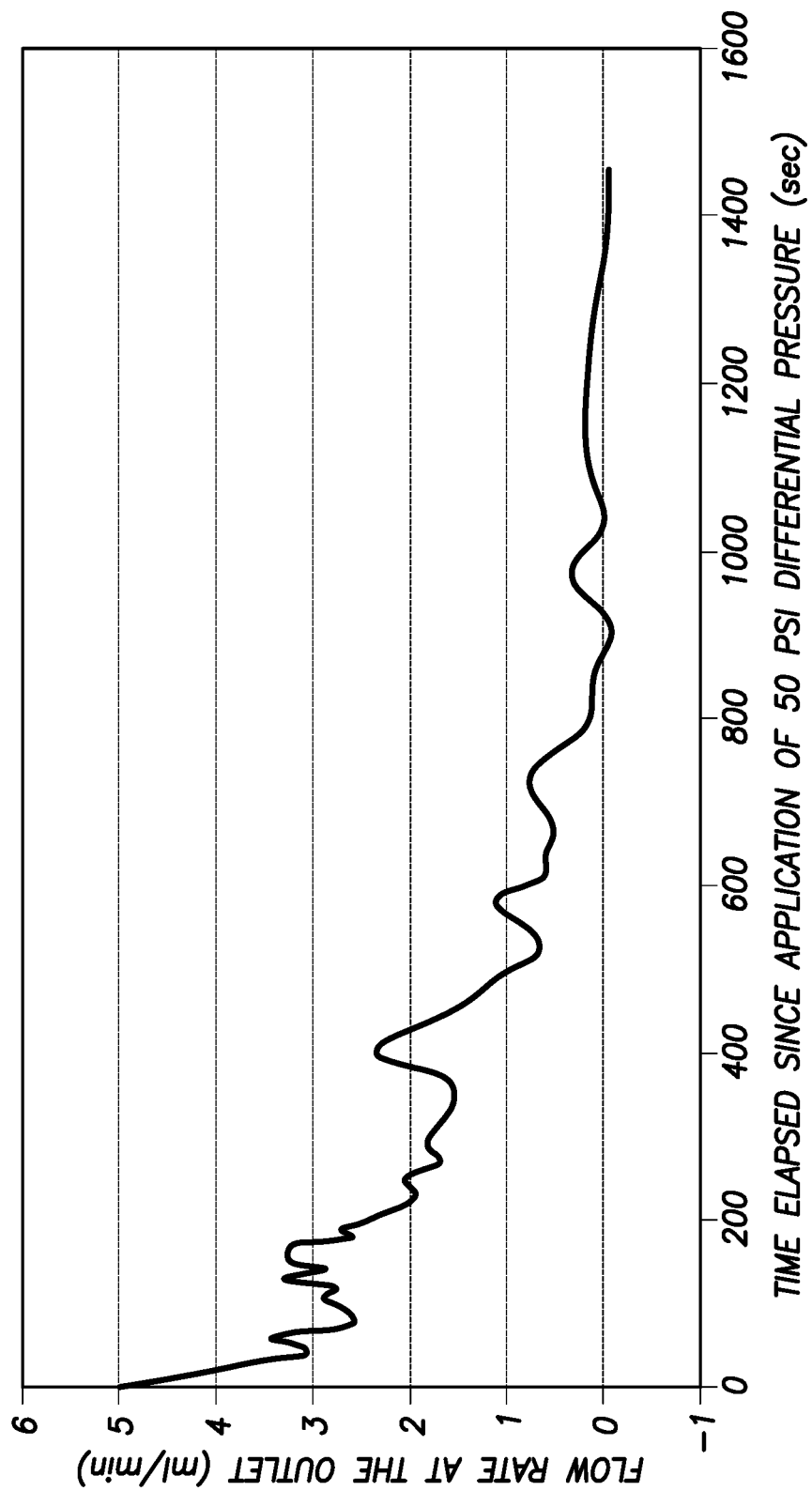
FIG. 4 is a graph illustrating data regarding flow rate versus time for the simulation of a composition of a treatment fluid plugging a loss zone in accordance with certain embodiments of the present disclosure.

FIG. 4 is a graph of the flow rate versus time for the first few minutes of this experiment, when the flow dynamics was fast. As shown in FIG. 4, after some initial dynamics, the flow came to rest about 16 minutes after the application of 50 psi differential pressure. These results show that the treatment fluids comprising LAPONITE®, a synthetic silicate, will come to rest after a finite time and after sweeping a finite volume when pumped through a loss zone. Further, once it comes to rest, the spacer composition resists higher pressure differential and offers resistance for the flow of cement into loss zone. This may ensure that cement flowed subsequent to the spacer composition is directed into the annulus only. Thus, this example shows that the spacer compositions will divert cement flow into the annulus by plugging loss zones in a continuous primary cementing process.

Similar flow tests were conducted using a conventional spacer composition of the same density as the MF-2 composition used in this example. In those tests the flow did not stop before all the spacer volume in the tank was consumed, even for a pressure differential as low as 10 psi.

Example 4

In this example, the experimental procedure of Example 3 was repeated using an MF-2 spacer composition and a packed bed with a permeability around 80 Darcy, higher than what was used in the experiment described above. A 10 psi differential pressure was applied, and the flow came to a halt after about 4 minutes. In that time, about 103 mL of fluid was swept.

The different permeability of the packed beds between this example and Example 3 represents two different type of loss zones. However, the common result from these two examples is that the treatment fluids of the present disclosure stop flowing in a finite time after sweeping a finite volume of fluid, and divert cement flow into the annulus.

In some embodiments, the methods of the present disclosure may comprise: introducing a treatment fluid comprising an aqueous base fluid and a synthetic silicate into a wellbore penetrating at least a portion of a subterranean formation comprising a loss zone; allowing the treatment fluid to displace at least a portion of a first fluid present in the wellbore; and allowing the treatment fluid to at least partially plug the loss zone.

In one or more embodiments described in the preceding paragraph, the method further comprises: allowing the treatment fluid to displace substantially all of the first fluid.

In one or more embodiments described in the preceding two paragraphs, the synthetic silicate is a synthetic magnesium silicate.

In one or more embodiments described in the preceding three paragraphs, the synthetic silicate is selected from the group consisting of: sodium magnesium silicate, sodium magnesium silicate tetrasodium pyrophosphate, sodium magnesium fluorosilicate, sodium magnesium fluorosilicate tetrasodium pyrophosphate, and any combination thereof.

In one or more embodiments described in the preceding four paragraphs, the treatment fluid further comprises a weighting agent.

In one or more embodiments described in the preceding five paragraphs, the synthetic silicate is present in an amount from about 0.1 to about 5.0% by weight of water in the treatment fluid.

In one or more embodiments described in the preceding six paragraphs, the treatment fluid is not settable.

In one or more embodiments described in the preceding seven paragraphs, the treatment fluid does not comprise a lost circulation material.

In one or more embodiments described in the preceding eight paragraphs, the treatment fluid is thixotropic.

In one or more embodiments described in the preceding nine paragraphs, the treatment fluid at 127° F. has a dial reading on a Fann Yield Strength Adapter at 3 rpm that is substantially similar to the dial reading at 300 rpm.

In one or more embodiments described in the preceding ten paragraphs, the treatment fluid has a 10 second gel strength at 127° F. of at least 20 lbf/100 ft$^2$.

In one or more embodiments described in the preceding eleven paragraphs, the first fluid is a drilling fluid.

In one or more embodiments described in the preceding twelve paragraphs, the method further comprises introducing a second fluid into the wellbore to displace at least a portion of the treatment fluid present in the wellbore, wherein the treatment fluid substantially separates the second fluid from the first fluid.

In one or more embodiments described in the preceding paragraph, the first fluid is a drilling fluid and the second fluid is a cementing fluid.

In one or more embodiments described in the preceding fourteen paragraphs, at least partially bridging the loss zone comprises allowing the gel strength of the fluid to increase.

In one or more embodiments described in the preceding fifteen paragraphs, the treatment fluid reduces fluid flow into the loss zone.

In one or more embodiments described in the preceding sixteen paragraphs, the treatment fluid is introduced into the wellbore using one or more pumps.

In some embodiments, the methods of the present disclosure may comprise: introducing a treatment fluid comprising an aqueous base fluid and a synthetic silicate into a wellbore penetrating at least a portion of a subterranean formation comprising a loss zone, wherein the treatment fluid displaces at least a portion of a first fluid present in the wellbore and reduces fluid flow into the loss zone.

In one or more embodiments described in the preceding paragraph, the treatment fluid does not comprise a lost circulation material.

In some embodiments, the methods of the present disclosure may comprise: introducing a first fluid into a wellbore penetrating at least a portion of a subterranean formation comprising a loss zone; introducing a treatment fluid comprising an aqueous base fluid and a synthetic silicate into the wellbore; allowing the treatment fluid to displace at least a portion of the first fluid; and allowing the treatment fluid to at least partially plug the loss zone.

In one or more embodiments described in the preceding paragraph, the method further comprises introducing a second fluid into the wellbore, wherein the treatment fluid substantially separates the first fluid from the second fluid.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
introducing a treatment fluid comprising an aqueous base fluid and a synthetic silicate into a wellbore penetrating at least a portion of a subterranean formation comprising a loss zone, wherein the treatment fluid is gellable but not settable and the synthetic silicate is present in an amount sufficient to provide the treatment fluid with a 60 minute gel strength of at least 70 lbf/100 ft$^2$;
allowing the treatment fluid to displace at least a portion of a first fluid present in the wellbore; and
allowing the treatment fluid to at least partially plug the loss zone.

2. The method of claim 1, further comprising allowing the treatment fluid to displace substantially all of the first fluid.

3. The method of claim 1, wherein the synthetic silicate is a synthetic magnesium silicate.

4. The method of claim 1, wherein the synthetic silicate is selected from the group consisting of: sodium magnesium silicate, sodium magnesium silicate tetrasodium pyrophosphate, sodium magnesium fluorosilicate, sodium magnesium fluorosilicate tetrasodium pyrophosphate, and any combination thereof.

5. The method of claim 1, wherein the treatment fluid further comprises a weighting agent.

6. The method of claim 1, wherein the synthetic silicate is present in an amount from about 0.1 to about 5.0% by weight of water in the treatment fluid.

7. The method of claim 1, wherein the treatment fluid does not comprise a lost circulation material.

8. The method of claim 1, wherein the treatment fluid is thixotropic.

9. The method of claim 1, wherein the treatment fluid at 127° F. has a dial reading on a Fann Yield Strength Adapter at 3 rpm that is substantially similar to the dial reading at 300 rpm.

10. The method of claim 1, wherein the treatment fluid is introduced into the wellbore using one or more pumps.

11. The method of claim 1, wherein the first fluid is a drilling fluid.

12. The method of claim 1, further comprising introducing a second fluid into the wellbore to displace at least a portion of the treatment fluid present in the wellbore, wherein the treatment fluid substantially separates the second fluid from the first fluid.

13. The method of claim 12, wherein the first fluid is a drilling fluid and the second fluid is a cementing fluid.

14. The method of claim 1, wherein at least partially bridging the loss zone comprises allowing a gel strength of the treatment fluid to increase.

15. The method of claim 1, wherein the treatment fluid reduces fluid flow into the loss zone.

16. A method comprising:
introducing a treatment fluid comprising an aqueous base fluid and a synthetic silicate into a wellbore penetrating at least a portion of a subterranean formation comprising a loss zone,
wherein the treatment fluid is gellable but not settable and free of a natural clay prior to introduction into the wellbore, and wherein the treatment fluid displaces at least a portion of a first fluid present in the wellbore and reduces fluid flow into the loss zone.

17. The method of claim 16, wherein the treatment fluid does not comprise a lost circulation material.

18. A method comprising:
introducing a first fluid into a wellbore penetrating at least a portion of a subterranean formation comprising a loss zone;
introducing a treatment fluid comprising an aqueous base fluid, hollow microspheres, and a synthetic silicate into the wellbore, wherein the treatment fluid is gellable but not settable;
allowing the treatment fluid to displace at least a portion of the first fluid; and
allowing the treatment fluid to at least partially plug the loss zone.

19. The method of claim 18, further comprising introducing a second fluid into the wellbore, wherein the treatment fluid substantially separates the first fluid from the second fluid.

* * * * *